Patented Sept. 4, 1945

2,383,995

UNITED STATES PATENT OFFICE 2,383,995

COLORED MATERIAL

Edmund Stanley, Christopher Stanley Argyle, and Henry Charles Olpin, Spondon, near Derby, England, assignors to British Celanese Limited, London, England, a company of Great Britain No Drawing. Application June 25, 1942, Serial No. 448,440. In Great Britain July 15, 1941

8 Claims. (Cl. 106—186)

This invention relates to the production of colored fibres, foils, films, and the like of cellulose acetate or other cellulose esters or ethers or of other film-forming materials, for example polymerised vinyl compounds.

According to the present invention, such colored fibres, foils, films and the like are produced by shaping into the desired form and then setting a solution of the film-forming material, said solution containing an arylamino-anthraquinone and especially an arylamino-anthraquinone free from amino groups other than arylamino groups. Especially valuable products are obtainable when the arylamino-anthraquinone is a 1:4-di(arylamino)-anthraquinone. With the aid of the latter it is possible to produce cellulose acetate or other cellulose ester or ether fibres colored in blue to green shades which are both of good fastness to light and washing and very resistant to the action of combustion products of coal gas. This latter property is a very great merit, particularly in conjunction with fastness to light, since the combination is rarely encountered in blue to green dyes which can be used for coloring cellulose ester and ether textiles.

A further merit of the new process is that with its aid it is possible to prepare colored artificial fibres of cellulose acetate or other film-forming materials which are bright in shade and lack the undesirable "greasy" appearance which so very often characterises artificial fibres spun from solutions colored with pigments.

Various arylamino-anthraquinones can be employed and the aryl radicle can be, for example, an aryl radicle of the benzene series containing but one benzene nucleus, e. g., phenyl, o-, m-, or p-tolyl, p-butylphenyl-, o-, m-, or p-methoxy-phenol, o-, m-, or p-ethoxy phenyl, o-, m-, or p-(beta-hydroxyethoxy)-phenyl, or p-(acetylamino)-phenyl. The compounds may contain one or more than one arylamino group and nuclear substituents may be present in addition to the arylamino group or groups, for example hydroxyl groups, free amino groups, alkylated amino groups, or aralkylated amino groups. Sulphonic or carboxylic groups are preferably absent.

The following are some arylamino anthraquinones which may be employed, colors being indicated in parentheses.

(a) 1-arylamino-anthraquinones free from further nuclear substituents, e. g., 1-phenylamino-anthraquinone (red), 1-m-tolylamino-anthraquinone (red), 1-ortho-methoxy phenyl-amino-anthraquinone (bluish-red), and 1-(p-phenyl-phenylamino)-anthraquinone (red).

(b) 1-hydroxy-4-arylamino-anthraquinones, e. g., 1-hydroxy-4-p-tolylamino-anthraquinone (blue-violet), 1-hydroxy-4-(p-acetylamino phenylamino)-anthraquinone (blue-violet) and 1:8-dihydroxy-4-(p-acetylamino phenylamino)-anthraquinone (blue).

(c) 4-arylamino-anthraquinones containing a free amino group or an alkyl-amino group in the 1-position, e. g., 1-amino-4-phenylamino-anthraquinone (violet-blue), 1-amino-4-p-tolylamino-anthraquinone (blue), and 1-amino-4-(p-acetylamino-phenylamino)-anthraquinone (blue).

(d) 1:4-, 1:5-, and 1:8-di-(arylamino)-anthraquinones, e. g., 1:4-di-(phenylamino)-anthraquinone (blue), 1:4-di-(m-tolylamino)-anthraquinone (blue), 1:4-di-(o-methoxy phenylamino)-anthraquinone (blue-green), 1:4-di-(o-methoxy phenylamino)-5-hydroxy-anthraquinone (blue-green), 1:5-di-(o-methoxy phenylamino)-anthraquinone (violet), 1:8-di-(o-methoxy phenylamino)-anthraquinone (violet), 1:5-di-(phenylamino)-anthraquinone (red-violet), 1:8-di-(phenylamino)-anthraquinone (violet), and 1:4-di-alpha-naphthylamino)-anthraquinone.

Mixtures of two or more of the arylamino-anthraquinones may be employed, if desired.

It is preferred to employ arylamino anthraquinones which have little or substantially no affinity for the cellulose acetate or other cellulose ester or ether when they are applied as aqueous dispersions. The di-(arylamino)-anthraquinones are particularly suitable in this respect and yield colored products which are very fast to washing and from which very little color bleeds on to wool, cotton or other textile material subjected to scouring or other aqueous treatment in contact therewith. As already indicated, the 1:4-di-(arylamino)-anthraquinones are especially valuable by reason of their yielding blue to green shades which are not only of very good fastness to washing but are also very resistant to the action of combustion products of coal gas.

The o-methoxy-phenylamino-anthraquinones are particularly useful since they have such solubility in organic liquids, particularly acetone, that sufficient can readily be dissolved in cellulose acetate or other spinning solutions for the latter to yield, on spinning, products colored in full shades.

The fibre or film-forming solutions containing the arylamino-anthraquinone dyes can be prepared in various ways. For example, where the dye is soluble to the requisite extent in the solvent for the film-forming material it may be simply mixed therewith before, during, or after effecting solution of the film-forming material. Where the dye is not soluble to the extent necessary to produce the required depth of shade, the part thereof which is not dissolved should be in very finely divided state. For example, the dyestuff may be finely milled and intimately mixed with the solution of the film-forming material. The milling is advantageously effected in the presence of a portion of the cellulose ester or ether solvent and with or without addition of a portion of the film-forming material. A particularly satisfactory way of reducing the dyestuff to the requisite fine state of dispersion is to work it, e. g., by kneading, rolling or the like, together with film-forming material and sufficient solvent for the latter to form a dough, the mechanical treatment being continued while evaporating solvent until the product can be ground to powder. After grinding, the product can be incorporated with the requisite solvent and such further quantity of film-forming material as may be necessary.

The arylamino-anthraquinones can be employed in various proportions. Particularly valuable are products containing at least 0.05 per cent, for example from 0.05 per cent to 1.5 per cent based on the weight of the cellulose acetate or other film-forming material. Products containing more than 0.1 per cent, for example from 0.1 per cent to 1 per cent are especially useful. The invention particularly contemplates cellulose acetate or other cellulose ester or ethe fibres, foils, films and the like containing di-(arylamino)-anthraquinones, particularly 1:4-diarylamino-anthraquinones, in the aforesaid proportions. Such products are very valuable by reason of their fullness of shade and the excellent fastness properties of the latter, and they cannot be obtained by applying aqueous dispersions of the said arylamino-anthraquinones to the uncolored materials. Their resistance to combustion products of coal gas is notably better than that of blue to green shades obtainable with 1:4 diamino-anthraquinones in which at least one of the amino-groups does not carry a substituent or carries as a substituent only an alkyl group (whether an unsubstituted alkyl group or a substituted alkyl group).

Either wet or dry methods may be used for the setting of the solutions of the film-forming materials containing the arylamino-anthraquinones so as to produce fibres, films and the like; for instance fibres may be produced by spinning the solutions either into suitable evaporative atmospheres or into suitable coagulating baths. Again foils or films can be produced by casting the solutions on film-forming devices of the wheel or band type and effecting setting by evaporation of the solvent.

The colored materials produced in accordance with the invention may subsequently be topped with other dyes and particularly with direct dyeing dyes for cellulose esters or ethers, for example, the water-insoluble dyestuffs of the nitro-diarylamine, azo, or amino anthraquinone series, such as are extensively employed for the coloration of cellulose acetate materials. The topping coloring matter may be applied either uniformly or locally according to the effects it is desired to produce. The topping colors may be applied, for instance, in aqueous solution or dispersion according to their nature, or in solution in organic solvents as described, for example, in U. S. Patents Nos. 1,738,978, 1,927,145, and British Patent No. 460,575. A single colored material produced in accordance with the invention can thus be utilised to yield a range of materials of different shades. In producing by this method compound shades which would normally require the use of blue or green dyes in addition to other dyes, it is particularly advantageous to incorporate the blue or green component in the form of an arylamino-anthraquinone in accordance with the invention and to incorporate the remaining component or components by applying direct dyeing dyes. The merit of this procedure is that of the available direct dyeing dyes for cellulose esters or ethers blues and greens are as a class much less resistant to coal gas combustion products than other colors.

The invention is of especial value in the production of colored cellulose acetate fibres, foils, films and the like. Similar colored materials of other film-forming materials, particularly other cellulose esters or ethers can be obtained likewise, for example materials of cellulose propionate, butyrate, aceto-propionate, aceto-butyrate, nitro-acetate, and of methyl, ethyl, and benzyl celluloses. The invention is illustrated by the following examples:

*Example 1*

An acetone solution of cellulose acetate is prepared containing 25 parts of the latter in 100 parts of solution and to 100 parts of this solution is added 0.05 part of finely divided 1:4-di-(diphenylamino)-anthraquinone. The mixture is stirred for a sufficient time to ensure complete solution of the dyestuff and is then dry-spun in the usual manner into yarn of any desired denier. The yarn so obtained is blue and lustrous and contains 0.2% of dyestuff.

*Example 2*

A colored yarn obtained as in Example 1 is woven into a fabric, for example a taffeta fabric and after preliminary steeping or scouring is dyed on the jig or winch from a soap bath to which has been added 5% (calculated on the weight of fabric) of a 10% aqueous paste of 2-nitro-4'-chlor-diphenylamine. After completion of the dyeing the material is rinsed in warm water, dried and finished, giving a bright green shade of very good fastness to light and burnt gas fumes. No appreciable amount of the blue dyestuff is removed from the fabric during these treatments. Other direct dyeing dyes can be applied similarly. For example, 4-chlor-2-nitro-4'-methyl-diphenylamine or 4-chlor-2-nitro-4'-methoxy-diphenylamine can be used in order to obtain almond green shades.

Having described our invention what we desire to secure by Letters Patent is:

1. Fibers of a cellulose derivative selected from the group consisting of cellulose esters and cellulose ethers and containing at least 0.1% of a 1:4-di-(arylamino)-anthraquinone, said fibers being formed by spinning a solution of said cellulose derivative containing said 1:4-di-(arylamino)-anthraquinone.

2. Cellulose acetate fibers containing at least 0.1% of a 1:4-di-(arylamino)-anthraquinone, said fibers being formed by spinning a solution of said cellulose acetate containing said 1:4-di-(arylamino)-anthraquinone.

3. Fibers of a cellulose derivative selected from the group consisting of cellulose esters and cellulose ethers and containing at least 0.1% of a 1:4-di-(arylamino)-anthraquinone in which the arylamino groups are the sole nuclear substituents, said fibers being formed by spinning a solution of said cellulose derivative containing said di-(arylamino)-anthraquinone.

4. Cellulose acetate fibers containing at least 0.1% of a 1:4-di-(arylamino)-anthraquinone in which the arylamino groups are the sole nuclear substituents, said fibers being formed by spinning a solution of said cellulose acetate containing said di-(arylamino)-anthraquinone.

5. Cellulose acetate fibers containing from 0.1% to 1% of a 1:4-di-(arylamino)-anthraquinone, said fibers being formed by spinning a solution of said cellulose acetate containing said 1:4-di-(arylamino)-anthraquinone.

6. Cellulose acetate fibers containing from 0.1% to 1% of 1:4-di(phenylamino)-anthraquinone, said fibers being formed by spinning a solution of said cellulose acetate containing said 1:4-di-(phenylamino)-anthraquinone.

7. Cellulose acetate fibers containing from 0.1% to 1% of 1:4-di-(o-anisylamino)-anthraquinone, said fibers being formed by spinning a solution of said cellulose acetate containing said 1:4-di-(o-anisylamino)-anthraquinone.

8. Cellulose acetate fibers containing from 0.1% to 1% of 1:4-di-(m-tolylamino)-anthraquinone, said fibers being formed by spinning a solution of said cellulose acetate containing said 1:4-di-(m-tolylamino)-anthraquinone.

ERMUND STANLEY.
CHRISTOPHER STANLEY ARGYLE.
HENRY CHARLES OLPIN.